(12) United States Patent
Nielsen et al.

(10) Patent No.: US 7,758,985 B2
(45) Date of Patent: Jul. 20, 2010

(54) FUEL CELL SENSORS AND METHODS

(75) Inventors: Peter Nielsen, Fredericia (DK); Ulrik Karlsson, Fredericia (DK)

(73) Assignee: American Power Conversion Corporation, W. Kingston, RI (US)

( * ) Notice: Subject to any disclaimer, the term of this patent is extended or adjusted under 35 U.S.C. 154(b) by 1226 days.

(21) Appl. No.: 11/313,855

(22) Filed: Dec. 21, 2005

(65) Prior Publication Data

US 2007/0141413 A1      Jun. 21, 2007

(51) Int. Cl.
*H01M 8/00* (2006.01)
*H01M 8/04* (2006.01)
(52) U.S. Cl. .............................. 429/22; 429/23; 429/13
(58) Field of Classification Search ................ 429/19
See application file for complete search history.

(56) References Cited

U.S. PATENT DOCUMENTS

| 4,052,657 | A | * | 10/1977 | Kleiner et al. ................ 363/43 |
|---|---|---|---|---|
| 4,820,954 | A | | 4/1989 | Sugita |
| 6,451,467 | B1 | * | 9/2002 | Peschke et al. ................ 429/23 |
| 6,942,939 | B2 | | 9/2005 | Xie |
| 2002/0136939 | A1 | * | 9/2002 | Grieve et al. .................. 429/23 |
| 2004/0104342 | A1 | * | 6/2004 | Yamada et al. .............. 250/288 |
| 2005/0206342 | A1 | | 9/2005 | Aleyraz |
| 2005/0233195 | A1 | | 10/2005 | Arnold |

* cited by examiner

*Primary Examiner*—Patrick Ryan
*Assistant Examiner*—Ashley Kwon
(74) *Attorney, Agent, or Firm*—Lando & Anastasi, LLP

(57) ABSTRACT

Control systems, sensors and methods for controlling the fuel concentration in a fuel cell or a fuel cell stack are provided. In certain examples, the control system may be configured to detect a performance degradation, and the fuel concentration provided to the fuel cell may be adjusted in response to detection of the performance degradation.

21 Claims, 14 Drawing Sheets

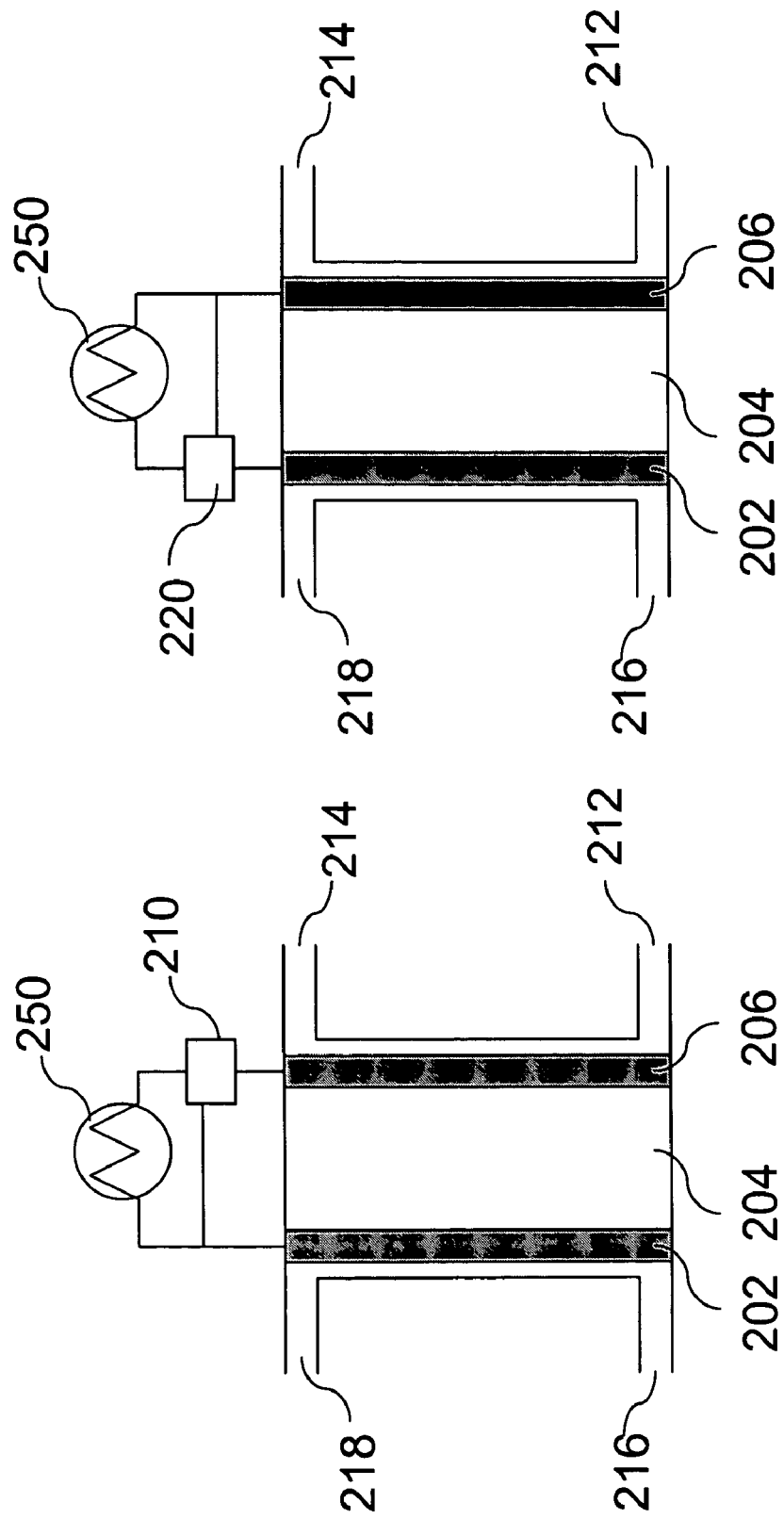

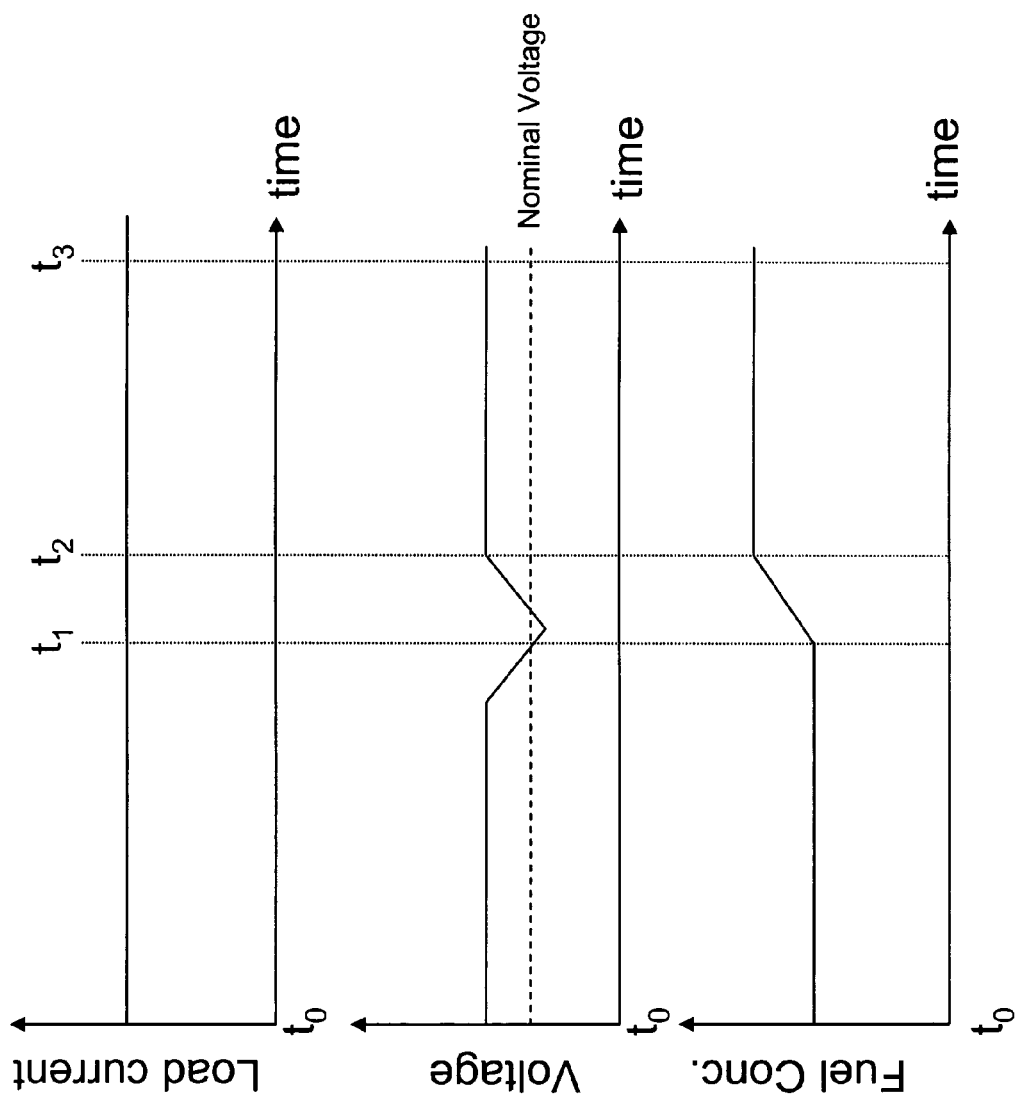

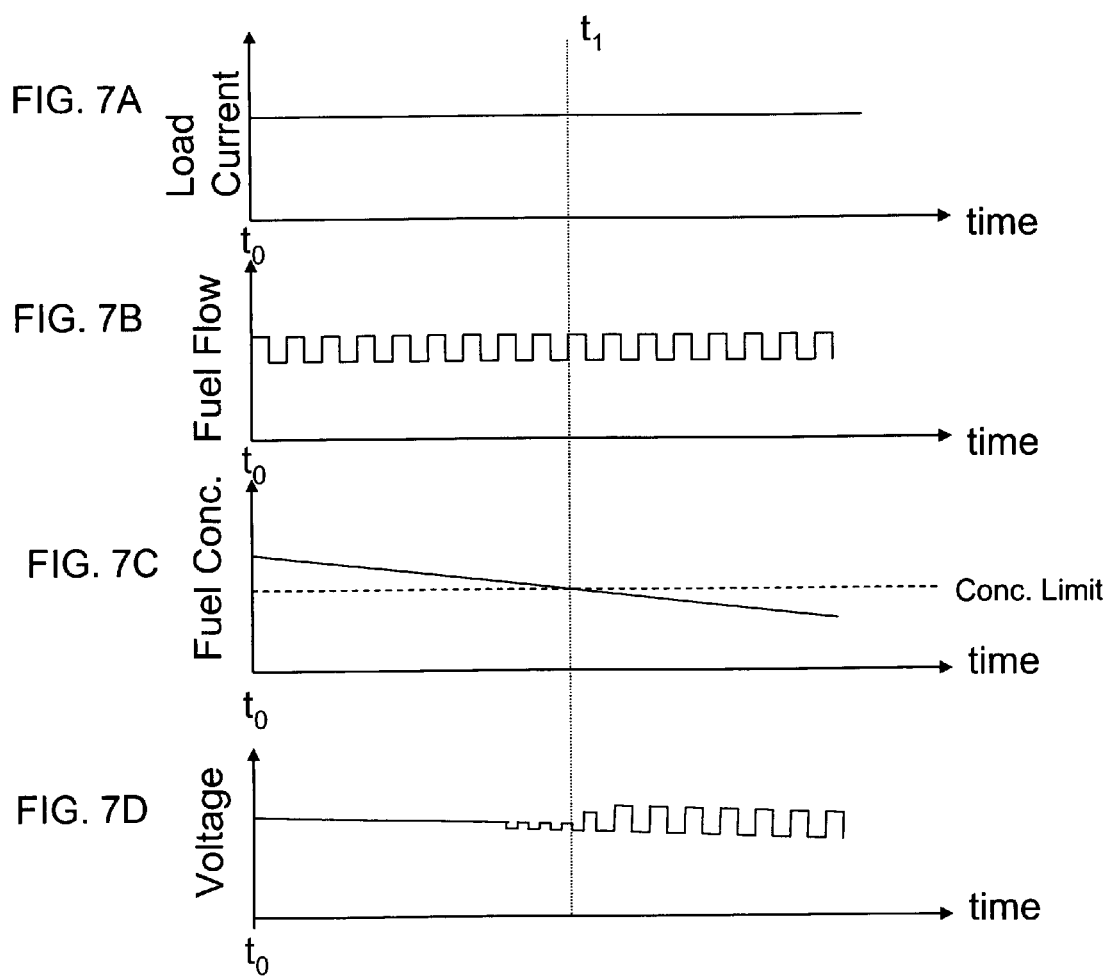

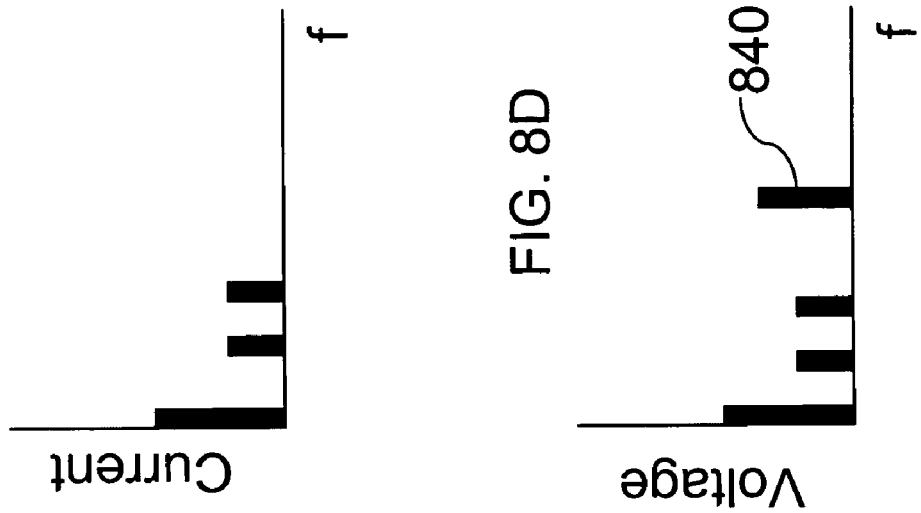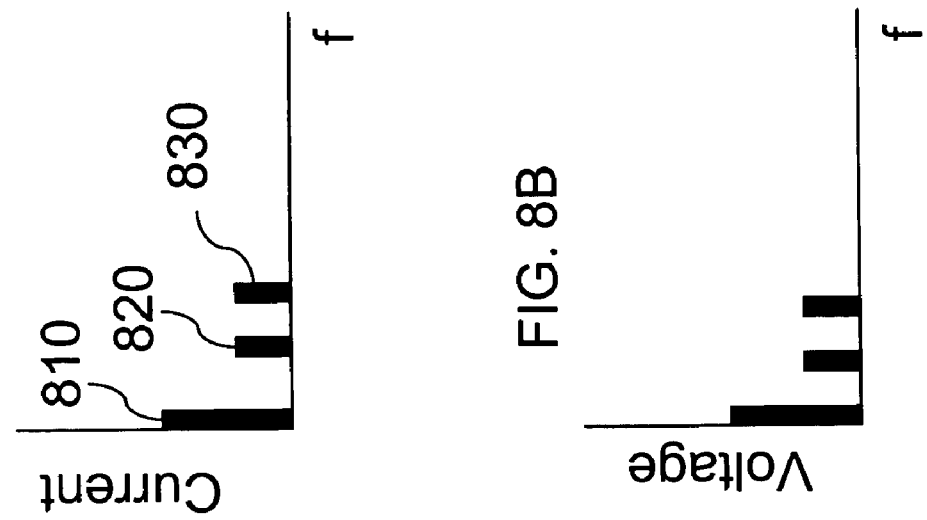

FUEL CELL SENSORS AND METHODS

FIELD OF THE TECHNOLOGY

Certain examples relate to sensors and methods for use with a fuel cell and/or a fuel cell assembly. More particularly, certain examples relate to sensors and methods to regulate or alter the fuel concentration in a fuel cell and/or a fuel cell assembly.

BACKGROUND

Direct methanol fuel cells are usually fed by atmospheric air on the cathode side of the membrane and methanol diluted in water on the anode side of the membrane. When large amounts of methanol are provided to the anode side of the membrane, the methanol may pass through the membrane and be oxidized at the cathode side of the membrane. This process results in wasting of methanol and also results in loss of cell voltage by unwanted cathode side reaction of methanol. There remains a need for better ways to regulate the concentration of fuel in a fuel cell to provide better fuel cell performance.

SUMMARY

Certain examples of the technology disclosed herein are directed to a control system, a fuel cell and sensors and methods for use in a fuel cell and/or a fuel cell assembly. In particular, certain examples disclosed below are directed to a control system configured to detect and/or regulate the fuel concentration, fuel flow, or both, in a fuel cell. Illustrative features and aspects of this technology are described below to demonstrate further some of the useful and novel applications of the technology disclosed herein.

In accordance with a first aspect, a control system configured to control the concentration of fuel provided to an anode of a fuel cell and to adjust the concentration of fuel provided to the anode in response to detection of a performance degradation is disclosed. In certain examples, the control system may include a first device constructed and arranged to control the concentration of fuel provided to the anode and a second device constructed and arranged to alter the concentration of fuel provided to the anode. In other examples, the control system may be configured to alter the concentration of fuel provided to the anode while the fuel flow rate remains substantially constant. Other illustrative features of a control system are described herein and additional features will be readily selected by the person of ordinary skill in the art, given the benefit of this disclosure.

In accordance with an additional aspect, a fuel cell is provided. In certain examples, the fuel cell includes a cathode, an anode electrically coupled to the cathode, an electrolyte between the cathode and the anode, and a control system configured to control the concentration of fuel provided to the anode and to adjust the concentration of fuel provided to the anode in response to detection of a performance degradation. In certain examples, the control system may include a first device constructed and arranged to control the fuel concentration provided to the anode and a second device constructed and arranged to alter the fuel concentration provided to the anode. In some examples, the second device may be configured to increase the concentration of fuel provided to the anode in response to detection of a voltage drop below a nominal voltage. In other examples, the second device may be configured to increase the concentration of fuel provided to the anode in response to detection of a frequency in a fuel cell voltage that corresponds to a modulation frequency used to modulate the flow of fuel. In certain examples, the second device may be configured to decrease the concentration of fuel provided to the anode of the fuel cell in response to detection of carbon dioxide at a cathode of the fuel cell. In other examples, the control system may be configured to alter the concentration of fuel provided to the anode while the fuel flow rate remains substantially constant.

In accordance with another aspect, a fuel cell comprising a cathode, an anode electrically coupled to the cathode, an electrolyte between the cathode and the anode, and a sensor configured to detect fuel cell voltage and to send a first signal to increase fuel concentration provided to the anode in response to the fuel cell voltage decreasing below a nominal voltage is disclosed. In certain examples, the sensor may be configured to send a second signal to decrease the fuel concentration provided to the anode in response to the fuel cell voltage increasing above a nominal voltage.

In accordance with an additional aspect, a fuel cell comprising a cathode, an anode electrically coupled to the cathode, an electrolyte between the cathode and the anode, and a sensor configured to detect a modulation frequency in a fuel cell voltage and to send a first signal to increase fuel concentration provided to the anode when the modulation frequency is detected in a fuel cell voltage is provided. In certain examples, the sensor may be configured to send a second signal to decrease the fuel concentration provided to the anode when the modulation frequency is not detected in the fuel cell voltage.

In accordance with another aspect, a fuel cell comprising a cathode, an anode electrically coupled to the cathode, an electrolyte between the cathode and the anode and a sensor configured to detect carbon dioxide at a cathode of the fuel cell and to send a first signal to decrease the fuel concentration provided to the anode when the carbon dioxide is detected at the cathode is disclosed. In certain examples, the sensor may be configured to send a second signal to increase the fuel concentration provided to the anode when carbon dioxide is not detected at the cathode.

In accordance with an additional aspect, a method of regulating fuel concentration in a fuel cell is disclosed. In certain examples, the method comprises detecting a performance degradation of the fuel cell, and altering the fuel concentration provided to an anode of the fuel cell in response to detection of the performance degradation. In other examples, the method may include increasing the concentration of fuel provided to the anode of the fuel cell in response to detection of the performance degradation. In additional examples, the method may include modulating the flow of the fuel to the anode at a first frequency and increasing the fuel concentration provided to the anode when the first frequency is detected in a fuel cell voltage. In some examples, the method may also include decreasing the fuel concentration provided to the anode in response to detection of carbon dioxide at a cathode of the fuel cell.

In accordance with another aspect, a sensor is disclosed. In certain examples, the sensor may be configured to detect a performance degradation. In some examples, the sensor may be configured to detect a performance degradation in a direct methanol fuel cell. In certain examples, the sensor may be configured to send a control signal to alter fuel concentration provided to the fuel cell. In some examples, the sensor may be configured to send a control signal to increase fuel concentration provided to the fuel cell in response to detection of a voltage drop below a nominal voltage. In other examples, the sensor may be configured to send a control signal to increase fuel concentration provided to the fuel cell in response to detection of a modulation frequency in a fuel cell voltage. In additional examples, the sensor may be configured to send a control signal to decrease fuel concentration provided to the fuel cell in response to detection of carbon dioxide at a cathode of the fuel cell.

These aspects and additional aspects, features and embodiments are discussed in more detail below.

BRIEF DESCRIPTION OF THE FIGURES

Certain illustrative examples are described below with reference to the accompanying figures in which:

FIGS. 2A-2C are schematics of a fuel cell comprising a sensor in various configurations, in accordance with certain examples;

FIG. 3A is a graph of load current versus time, FIG. 3B is a graph of voltage versus time and FIG. 3C is a graph of fuel concentration versus time for a first method to regulate fuel concentration in a fuel cell, in accordance with certain examples;

FIG. 7A is a graph of load current versus time, FIG. 7B is a graph of fuel flow versus time, FIG. 7C is a graph of fuel concentration versus time and FIG. 7D is a graph of voltage versus time for an additional method to regulate fuel concentration in a fuel cell, in accordance with certain examples;

FIG. 8A is a graph from a frequency analysis of current, FIG. 8B is a graph from a frequency analysis of voltage where fuel concentration is at a suitable level, FIG. 8C is a graph from a frequency analysis of current and FIG. 8D is a graph from a frequency analysis of voltage where fuel concentration is below a suitable level, in accordance with certain examples;

Figure 1:
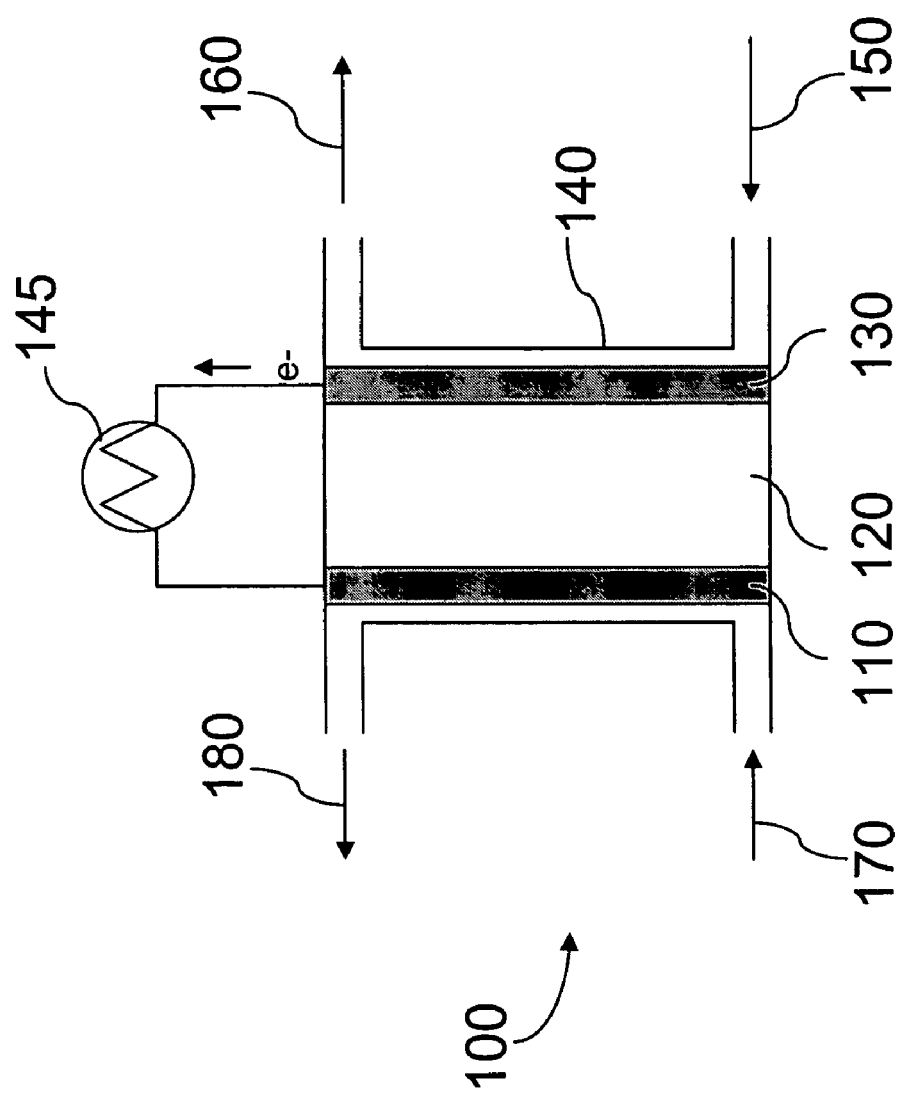
FIG. 1 is a schematic of a fuel cell assembly in which a fuel cell is electrically coupled to a load, in accordance with certain examples.

Certain features or components of the illustrative fuel cells, fuel cell assemblies, sensors and the like shown in the figures may have been enlarged or distorted relative to other features or components to facilitate a better understanding of the novel devices and methods disclosed here. It will be recognized by the person of ordinary skill in the art, given the benefit of this disclosure, that the fuel cells disclosed here, and methods of their use, can be used in different orientations relative to gravity and suitable orientations will be selected by the person of ordinary skill in the art, given the benefit of this disclosure. Unless otherwise clear from the context the use of the same numeral in different figures is intended to refer to a similar structure.

DETAILED DESCRIPTION OF CERTAIN EXAMPLES

Certain examples of the sensors, fuel cells and methods disclosed herein provide a technological advance that, for example, can improve fuel cell performance, reduce the amount of fuel used, and provide a substantially constant fuel cell output voltage.

In accordance with certain examples, many different types of fuel cells may use the sensors and methods disclosed herein. In a typical fuel cell, reactants are converted to products producing electric power in the process. Solid polymer electrochemical fuel cells generally employ a membrane electrode assembly that may include a solid polymer electrolyte or ion-exchange membrane between two porous or semi-porous electrically conductive electrode layers, with one electrode being a cathode and the other being an anode. The anode and cathode each typically comprise an electrocatalyst that can be deposited or placed at the membrane/electrode layer interface to favor a desired electrochemical reaction. A fuel can be supplied to the anode and oxidized at the anode to produce protons and electrons. The protons can migrate through the membrane towards the cathode. On the cathode side of the membrane, an oxidant can be supplied to the cathode and can react with the protons that have migrated through the membrane. An electric current is generated as the electrons produced at the anode migrate from the anode to the cathode through an external circuit. In certain examples, any fuel cell which uses a fuel source whose fuel has at least one carbon may benefit from the sensors and methods disclosed herein. For example, direct methane fuel cells, direct methanol fuel cells, direct ethanol fuel cells, direct propane fuel cells, direct 2-propanol fuel cells, etc. In some examples, the fuel cell may be a polymer electrolyte membrane (PEM) fuel cell. For convenience and illustration only, certain features are described below with reference to a direct methanol fuel cell (DMFC). It will be recognized by the person of ordinary skill in the art, given the benefit of this disclosure, that the technology disclosed herein may be applied to many different types of fuel cells.

The methods, sensors and fuel cells disclosed herein may be used in fuel cells or fuel cell stacks configured to generate primary power, to generate back up power, to generate power for portable or fixed devices, to co-generate power for a device and the like. In certain embodiments, the methods, sensors and fuel cells disclosed herein may be used in back up power devices, such as uninterruptible power supplies. In other examples, the methods, sensors and fuel cells disclosed herein may be used to provide power, either alone or in conjunction with a battery, to a portable device, such as a cellular phone, a MP3 player, a personal digital assistant, a watch, a calculator, a laptop computer and the like. The methods, sensors and fuel cells disclosed herein may be used in devices configured to supply small amounts of power, e.g., 500 Watts or less, or may be used in devices configured to supply substantial amounts of power, e.g., 2 kW, 5 kW, 10 kW or even more. The methods, sensors and fuel cells disclosed herein may be used in combination with electronic circuitry to couple electrically the sensors and fuel cells to a suitable controller, such as a microprocessor, to receive signals from the sensor. The controller may also be electrically coupled to a pump, a valve, a baffle or the like to control the flow of fuel to a fuel cell and/or to alter the fuel concentration in a fluid flow fed to the fuel cell. The controller may also be electrically coupled to a pump configured to supply an oxidant to the fuel cell, e.g., to a pump in fluid communication with an oxygen source or ambient air. Additional components suitable for configuring the fuel cells and fuel cell assemblies for primary power generation, back-up power generation and/or co-power generation will be readily selected by the person of ordinary skill in the art, given the benefit of this disclosure.

In accordance with certain examples, a fuel may be fed to a fuel cell based on integration of current with respect to time. In a typical fuel cell, this feeding is based on an open loop control (current integration). In contrast to a typical fuel cell, the fuel cells, sensors and methods disclosed herein, use this feeding of fuel as an inner control loop, e.g., use a first device constructed and arranged to control fuel concentration, and implement an outer control loop, e.g., use a second device constructed and arranged to alter fuel concentration, to provide corrective actions to the inner control loop based on performance degradation of the fuel cell. For example, if voltage drops below a threshold amount, an outer control loop may be implemented to send a signal to the inner control loop such that the fuel concentration in the fuel cell will be increased. In certain examples, if a modulation frequency is observed in a fuel cell voltage, then an outer control loop may be implemented to send a signal such that the inner control loop can increase the fuel concentration supplied to the fuel cell. In other examples, if carbon dioxide is detected at a cathode of a fuel cell, then an outer control loop may be implemented to send a signal such that the fuel concentration in the fuel cell can be decreased to minimize methanol crossover. Additional configurations and methods of implementing a first device and a second device to regulate the fuel concentration in a fuel cell will be readily selected by the person of ordinary skill in the art, given the benefit of this disclosure.

In accordance with certain examples, an illustrative fuel cell is shown in FIG. 1. A fuel cell 100 includes a cathode 110, an electrolyte 120 and an anode 130 electrically coupled to the cathode 110 in a housing 140. In this illustration, the fuel cell 100 is shown electrically coupled to a load 145. In a typical configuration, fuel is fed to the anode 130 in the direction of arrow 150. The anode 130 oxidizes the fuel, and products from the anode reaction are exhausted in the direction of arrow 160. Air, such as oxygen or ambient air, is fed to the cathode 110 in the direction of arrow 170. The cathode 110 reduces the air, and products from the cathode reaction are exhausted in the direction of arrow 180. In the case of a direct methanol fuel cell, a mixture of methanol and water is typically fed to the anode 130, and the methanol/water mixture is oxidized to carbon dioxide and water at the anode 130. In certain embodiments, the concentration of methanol may be adjusted in response to detection of a performance degradation. Air may be supplied to the cathode 110, and oxygen in the air is reduced to water at the cathode 110. In the overall balanced reaction, six electrons are produced for every molecule of methanol that is oxidized to carbon dioxide, and six electrons are used to reduce 3/2 molecules of oxygen to water. The electrons flow from the anode to the cathode to produce a current to power the load 145. Protons can migrate through the electrolyte 120, e.g., a membrane, from the anode 130 and may be used in the half reaction occurring at the cathode 110.

Performance of the fuel cell may degrade when fuel concentration is too low or too high in the fuel cell. For example, when the fuel concentration is too low, less than optimal anode reaction sites are occupied by methanol, which can cause a reduction in current or voltage. When the fuel concentration is too high, fuel cross-over may occur where a portion of the fuel passes through the membrane and is oxidized at the cathode. Such unwanted oxidation at the cathode can reduce current flow through the fuel cell by depolarizing the fuel cell. In certain examples, the devices and methods disclosed herein may be used to regulate the fuel concentration in a fuel cell, e.g., by altering the concentration of fuel in a fluid flow to the fuel cell, by altering the rate at which fuel is supplied to the fuel cell, or using other methods to change the concentration of fuel at an anode of the fuel cell.

Figure 2C:
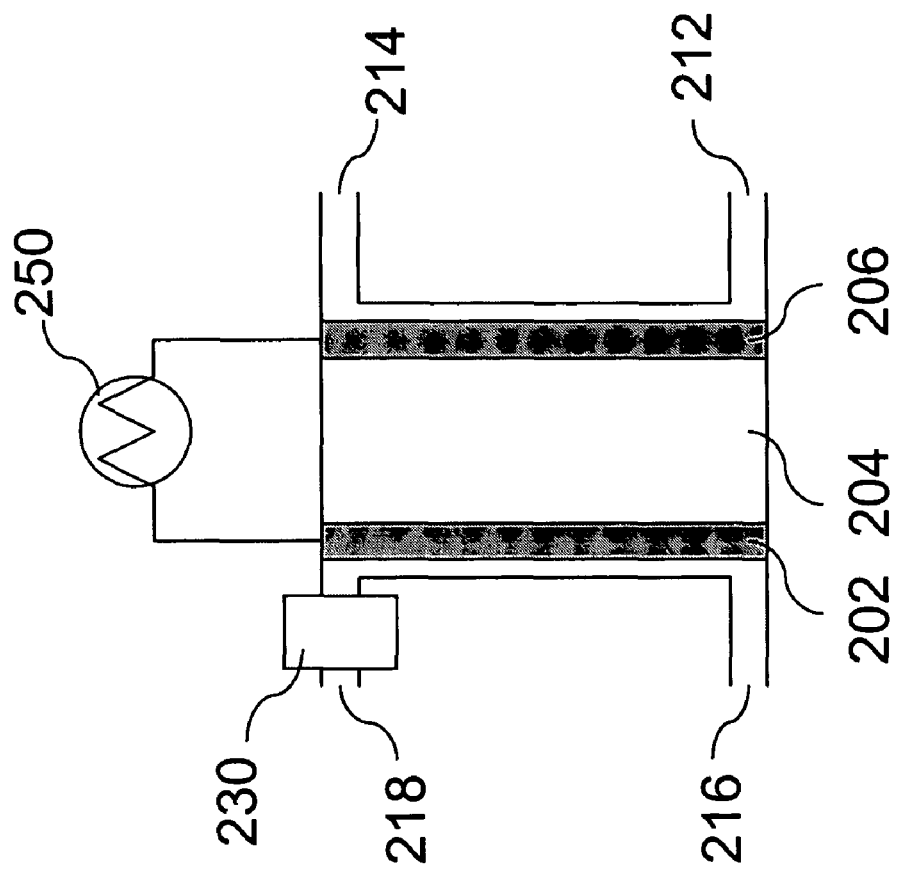

In accordance with certain examples and referring to FIGS. 2A-2C, a fuel cell comprising a cathode 202, an anode 206, a membrane 204 between the anode 202 and the cathode 206, and a sensor (one of 210, 220 and 230) in various configurations is shown. The exact placement of the sensor may vary depending on a performance variable that the sensor is selected to detect. For example and referring to FIG. 2A, a sensor 210 may be placed between the anode 206 and the load 250. Referring to FIG. 2B, a sensor 220 may be placed between the load 250 and the cathode 202. The sensor may be placed in one or more of the fuel input port 212, the air input port 216, the fuel exhaust port 214 or the air exhaust port 218. Referring to FIG. 2C, a sensor 230 may be placed in the air exhaust port 218. Additional configurations of a fuel cell that includes a sensor will be readily selected by the person of ordinary skill in the art, given the benefit of this disclosure. The exact configuration of the sensor depends on what performance variable the sensor is intended to sense or to detect. For example, where the sensor is selected to detect a voltage, the sensor may be an A/D converter and processor, a resistive voltage divider or the like. Where the sensor is selected to detect a current, the sensor may be, for example, a Hall sensor, a resistive shunt and the like. Where the sensor is selected to detect protons, the sensor may be, for example, a hydrogen selective electrode. Where the sensor is selected to detect a gas, such as carbon dioxide, the sensor may be, for example, an electrode, a carbon dioxide sensor, such as those commercially available from Texas Instruments, Inc., Sierra Monitor Corp., etc. The person of ordinary skill in the art, given the benefit of this disclosure, will be able to select suitable sensors for detecting a voltage, a current or other selected performance variable.

Figure 4A:
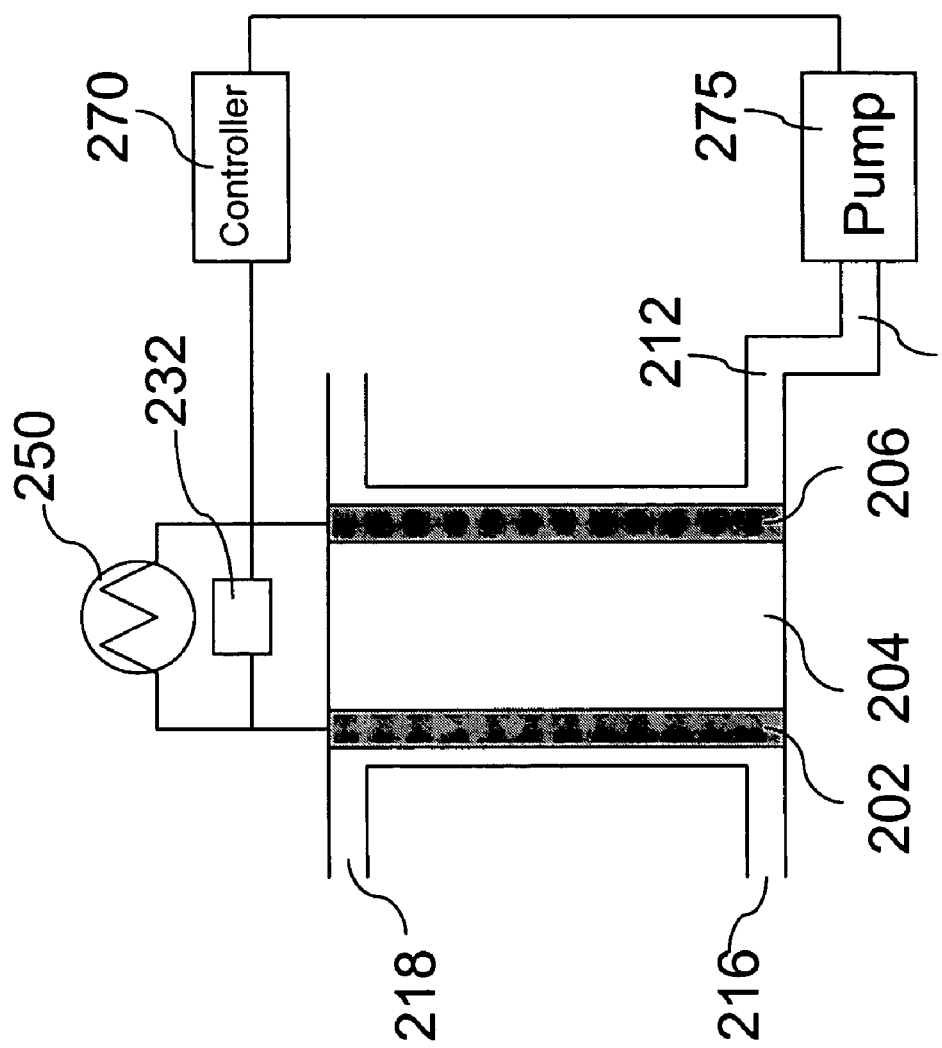
FIG. 4A is a first configuration of a fuel cell assembly comprising a fuel cell electrically coupled to a controller and a fuel pump, in accordance with certain examples.

In accordance with certain examples and referring to FIG. 4, a sensor 232 may be placed in the circuit between the cathode 202 and the anode 206. The sensor may be configured to detect indirectly a fuel concentration by detecting a fuel cell voltage drop or decrease below a nominal fuel cell voltage. A nominal fuel cell voltage is the voltage output of a fuel cell, or a fuel cell stack, during typical operation where a sufficient concentration of fuel is present at the anode to provide a desired output voltage suitable for powering a selected load. If the output voltage drops below the nominal fuel cell voltage, then the current supplied to a load may not be sufficient to power the load. For example and referring to FIGS. 3A-3C, graphs which represent load current versus time (FIG. 3A), stack voltage versus time (FIG. 3C), and fuel concentration versus time (FIG. 3C) are shown. Referring to FIG. 3A, the load current is shown as being substantially constant with time, e.g., substantially constant from time $t_0$ to $t_3$. This result is desirable as a decrease in current may prevent the load to which the fuel cell is electrically coupled to from functioning properly. Current integration may be performed by the inner control loop to determine whether or not sufficient current levels are present. When low concentrations of fuel are present, the voltage can decrease as not enough fuel is present to maintain the voltage (see FIGS. 3B and 3C). A small drop in voltage may be acceptable, however, a large drop in voltage is generally unacceptable. A sensor may be used to detect when the voltage drops below a threshold or nominal voltage and/or may be used to detect the current. For example and referring to FIGS. 3A-3C and FIG. 4A, the sensor 210 may detect that at time $t_1$ voltage is below a nominal voltage. The sensor may then send a signal to a controller 270, e.g., a fuel pump controller that is part of the inner control loop, which can send a signal to a pump to deliver fuel at a higher rate to the anode 206 of the fuel cell. Alternatively, the fuel pump can deliver more fuel to a mixing tank upstream of the anode such that the fuel concentration in a fluid flow supplied to the anode increases. The sensor may also be configured to measure or detect current such that current may be integrated by the controller. The controller 270 can increase the fuel concentration to the anode 206, for example, by increasing the rate at which fuel is pumped into the anode 206 by pump 275 through fluid conduit 276, by increasing the rate at which fuel is supplied to a mixing tank, or by otherwise increasing the concentration of fuel in a fluid flow supplied to an anode of the fuel cell. As the fuel concentration to the anode increases from time $t_1$ to time $t_2$ (see FIGS. 3B and 3C), the fuel cell voltage also increases up until time $t_2$, where the voltage has risen above the nominal voltage.

Figure 4B:
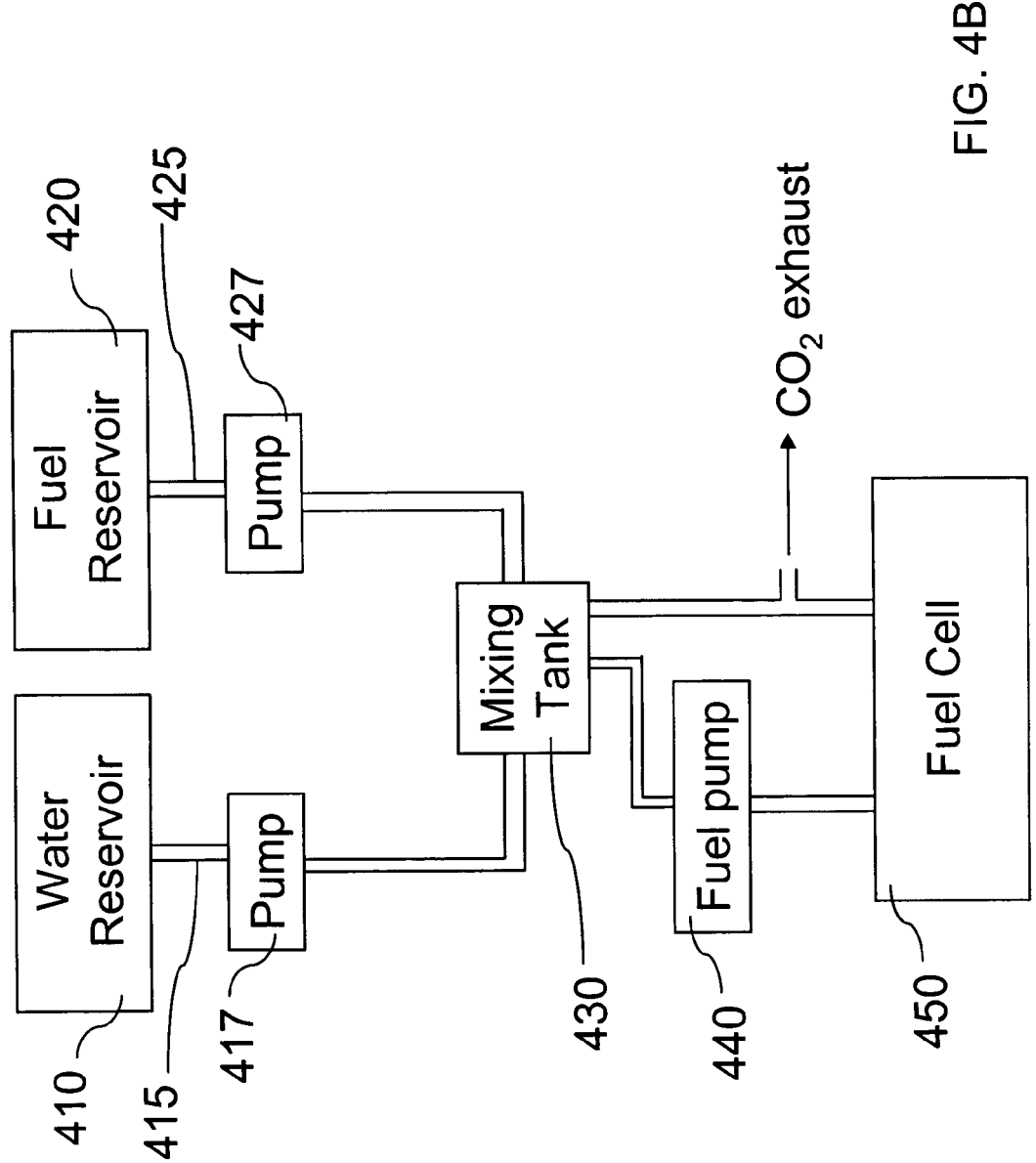
FIG. 4B is a second configuration of a fuel cell assembly comprising a fuel cell electrically coupled to a controller and a fuel pump, in accordance with certain examples.

In accordance with certain examples, an illustrative configuration for regulating a fuel concentration in a fuel cell is shown in FIG. 4B. A water reservoir 410 and a fuel reservoir 420 each is in fluid communication with a mixing tank 430 through fluid conduits, 415 and 425 respectively. Water may be supplied from the water reservoir 410 to the mixing tank 430 using a pump 417, and fuel may be supplied to the mixing tank 430 using a pump 427. In the mixing tank 430, fuel and water are mixed prior to supplying the fuel/water mixture to a fuel cell 450. The exact ratio of fuel to water may vary depending on the fuel cell. For example, a DMFC may use about 2-4% by volume methanol in water as a fuel source. The methanol concentration is produced by supplying a selected amount of methanol from a fuel reservoir and a selected amount of water from a water reservoir to a mixing tank where the final concentration of methanol is produced. This methanol concentration can be increased by providing more methanol to the mixing tank, providing less water to the mixing tank, or a combination of both. Once the selected concentration of fuel is present in the mixing tank 430, a fuel pump 440 can supply the fuel/water mixture to the fuel cell 450. The fuel cell 450 uses the fuel to produce a current. Exhaust gases, such as carbon dioxide may be expelled from the fuel cell 450 and any residual fuel may be recycled to the mixing tank 430. In embodiments discussed herein where a performance degradation is detected, a control system can send a signal to alter the concentration of fuel by supplying more or less fuel to the mixing tank to increase or to decrease, respectively, the fuel concentration. By altering the concentration of the fuel in the mixing tank, the fuel concentration at the anode of the fuel cell may be altered for a given fuel flow to the fuel cell.

Figures 5A, 5B, 5C:
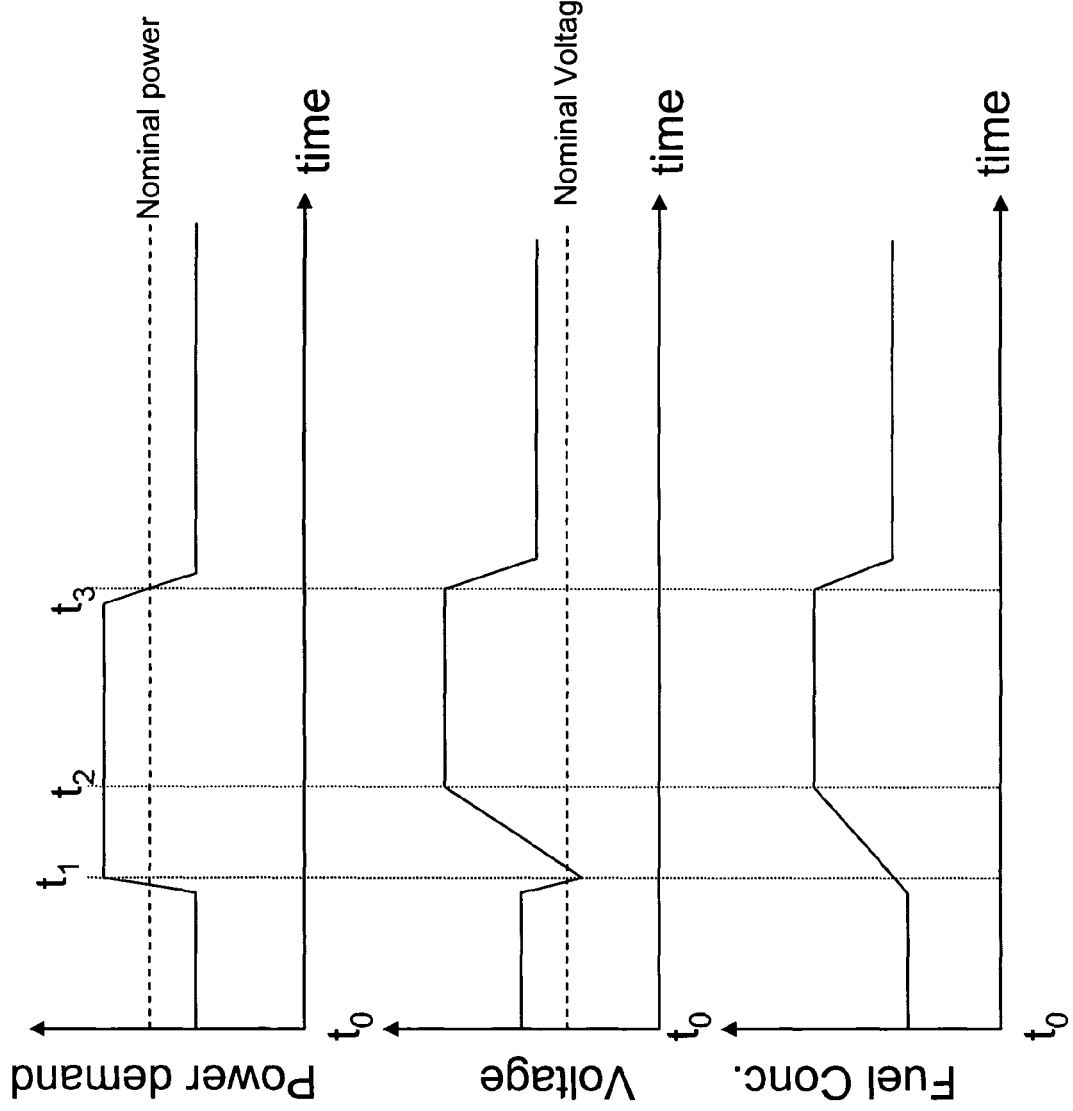
FIG. 5A is a graph of power demand versus time.
FIG. 5B is a graph of voltage versus time and FIG. 5C is a graph of fuel concentration versus time for another method to regulate fuel concentration in a fuel cell, in accordance with certain examples.

In certain embodiments, it may be desirable to maintain the fuel concentration at the new level to provide a substantially constant voltage. In other examples, however, it may be desirable to reduce the fuel concentration. For example, a drop in voltage may have been caused by a temporary increase in power demand. As power demand returns to normal, the fuel concentration in the fuel cell may be too high, which as discussed below, can reduce performance of the fuel cell to due cross-over of fuel to the cathode. This feature may be advantageous, for example, where a portable device switches from a standby mode, to an operational mode and then back to the standby mode. An illustration of this scheme is shown in FIGS. 5A-5C. When a sensor detects that the voltage drops below a nominal voltage at time $t_1$, the sensor can send a signal to a controller. The controller may be configured to increase the fuel concentration in the fuel cell to increase the output voltage. Alternatively, the sensor may be configured to detect when the power demand increases above a nominal power and can send a signal to increase the fuel concentration when such a power increase is detected. At time $t_2$, a sufficient fuel concentration is present to increase the voltage to a level above or equal to a nominal voltage to account for the increased power demand. At time $t_3$, the power demand decreases below a nominal power. The sensor can detect this decrease and send a signal to a controller to reduce the fuel concentration such that fuel can be conserved. Additional configurations for increasing and/or decreasing the fuel concentration in a fuel cell to account for increased power demand will be readily selected by the person of ordinary skill in the art, given the benefit of this disclosure.

In certain examples, it may be desirable to cycle the increasing and decreasing of the fuel concentration. For example, the voltage output may fluctuate over a range and still provide a usable current to a device. Rather than wait for the voltage to drop below a nominal voltage, the fuel concentration may be cyclically increased and decreased in such a manner that the average voltage remains above the nominal voltage. Such cycling may be accomplished, for example, by varying the rate at which fuel is pumped to the anode, by pumping fuel at a constant rate and opening and closing an intake valve to feed fuel cyclically to the anode, by increasing and decreasing the concentration of fuel in a fluid flow fed to the fuel cell, or by other using other methods and devices. It will be within the ability of the person of ordinary skill in the art, given the benefit of this disclosure, to select additional methods for providing fuel to maintain a voltage above a nominal voltage.

In accordance with certain examples, the method described above and referred to in FIGS. 3A-5C may be used in a direct methanol fuel cell (DMFC). For example, a methanol/water mixture may be introduced into the DMFC at the anode side. As voltage of the fuel cell decreases below a threshold or nominal voltage, the concentration of methanol in the methanol/water mixture supplied to the anode may be increased until the voltage rises above the nominal voltage. Subsequently, the increased concentration of methanol supplied to the anode may be maintained or reduced depending on the resulting voltage output of the fuel cell. In some examples, the cycle of increasing methanol concentration in the fuel flow until voltage output rises followed by subsequent decreases in methanol concentration in the fuel flow until voltage output drops may be performed to enhance fuel cell efficiency. In some examples, substantially pure methanol may be supplied to a mixing tank upstream of the fuel cell to increase the concentration of methanol in the fuel flow. As used herein, "substantially pure methanol" refers to methanol substantially absent of other compounds except for minor amounts (e.g., 1-3% or less) of impurities. The substantially pure methanol may be mixed with water, or other selected fluids, prior to introduction of a fuel flow into the fuel cell. It will be within the ability of the person of ordinary skill in the art, given the benefit of this disclosure, to design suitable direct methanol fuel cells configured to use the methods disclosed herein.

Figure 6:
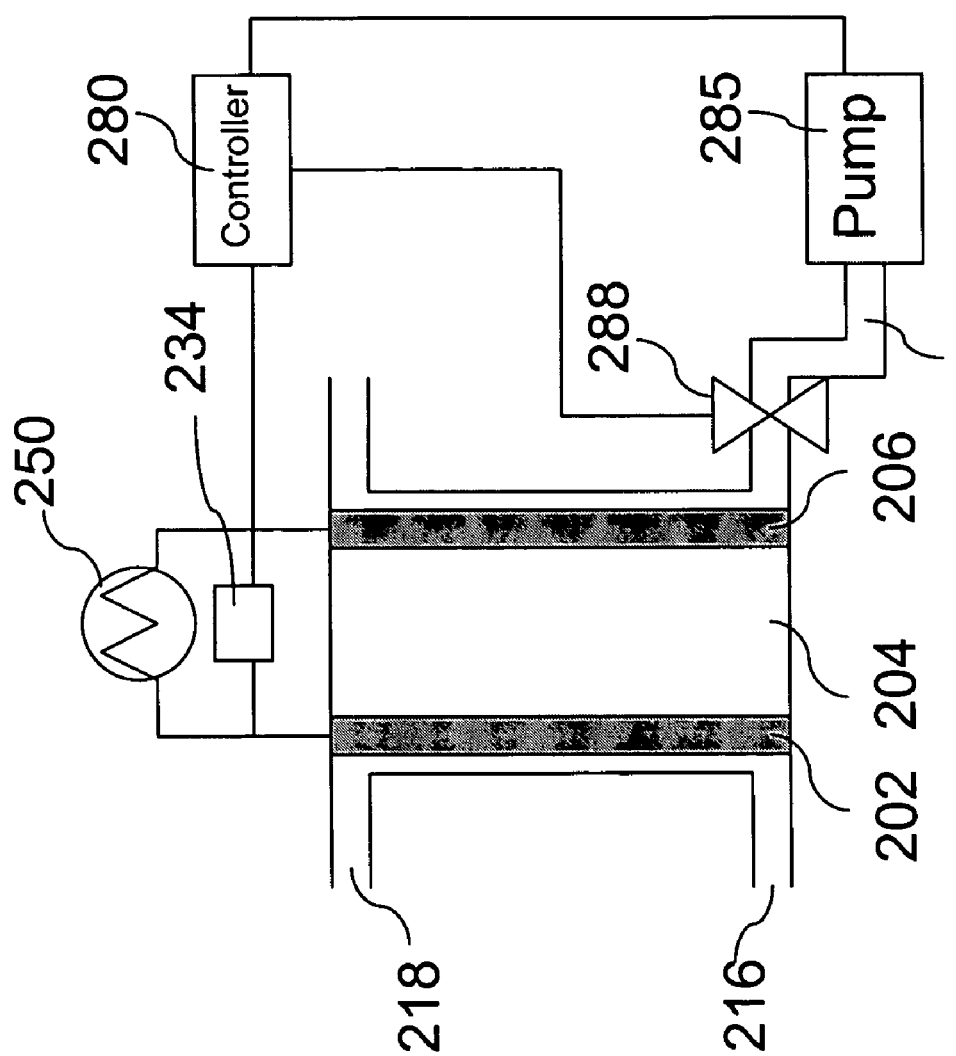
FIG. 6 is a second configuration of a fuel cell assembly electrically coupled to a controller, a fuel pump and a valve in a fuel supply line, in accordance with certain examples.

In accordance with certain examples, a sensor may be configured to detect a frequency in a fuel cell voltage that corresponds to a modulation frequency used to modulate fuel flow. For example and referring to FIG. 6, a fuel cell assembly may be configured such that pump 285 supplies fuel through fluid conduit 276 at a modulation frequency $f_0$. Modulation of the supplied fuel can cause variations in the fuel flow to the anode 206. When the combination of minimum flow and fuel concentration reaches a lower fuel concentration limit, voltage output is perturbed at a frequency that corresponds to the modulation frequency $f_0$. Sensor 234 can detect the modulation frequency $f_0$ in the output voltage, and an analysis of the frequency content of the voltage for the modulation frequency $f_0$ can provide an indicator that the fuel concentration is approaching, or has approached, a lower fuel concentration limit. An illustration of this scheme is shown in FIGS. 7A-7D, and a frequency analysis is shown in FIGS. 8A-8D. Fuel flow may be modulated, for example, at a frequency of $f_0$ (see FIG. 7B). If the fuel flow is insufficient to maintain the fuel concentration of the fuel cell for the given operating conditions, then a decrease in the fuel concentration at the anode may occur (see FIG. 7C). As the fuel concentration decreases at the anode, voltage will also decrease as less fuel is present to produce a voltage (see FIG. 7D). At time $t_1$, the fuel concentration decreases below a selected limit. As the fuel concentration decreases, the modulation frequency $f_0$ appears in the voltage. Analysis of the frequency content of the voltage can indicate whether or not the fuel flow is acceptable.

For example, referring to FIGS. 8A-8D, bar 810 represents a DC-component of the load current. Bars 820 and 830 are AC components representing load/change fluctuations (other bars for AC components could also be included though they have been omitted for clarity of this illustration). When the fuel concentration is within an acceptable range, a frequency analysis of the current draws from the fuel cell and the voltage across the fuel cell are generally symmetrical. When, however, the fuel concentration drops below an acceptable limit, a frequency analysis of the current and voltage do not provide the same results. Instead, the modulation frequency used to modulate fuel flow appears in the frequency analysis of the voltage (see bar 840, which represents an AC component of the modulation frequency, in FIG. 8D). As the modulation frequency is usually known or selected, a frequency analysis may be performed to determine whether or not the modulation frequency appears in the voltage. If so, a control signal may be sent such that the fuel concentration at the anode may be increased so that the voltage output can increase. In certain examples, additional fuel may be provided to the anode until the modulation frequency is or becomes undetectable in a frequency domain analysis of the voltage. Suitable controllers and/or filters that can perform transforms and/or frequency analyses will be readily selected by the person of ordinary skill in the art, given the benefit of this disclosure.

In certain configurations, the fuel flow may be modulated by modulating a pump used to supply fuel. For example, a signal may be sent by controller 280 (see FIG. 6), which can send a signal to switch a pump 285 on and off. Alternatively, a valve 288 in fluid line 276 may be opened and closed to modulate fuel supplied to the anode 206. The opening and closing of the valve may be controlled using controller 280, which may be electrically coupled to the valve 288. The frequency with which the valve 288 is modulated should correspond to the modulation frequency of the fuel flow. In certain examples, the valve may be a low cost solenoid valve. Additional methods of modulating the fuel flow will be readily selected by the person of ordinary skill in the art, given the benefit of this disclosure. The exact modulation frequency used may vary, and in certain configurations the modulation frequency may be about 0.1 Hz to about 2 Hz. In other examples, the concentration of fuel in a fluid flow supplied to the fuel cell may be increased by increasing the amount of fuel supplied to a mixing tank. For example, the fuel supplied to the mixing tank may be increased, for example, by about 20%, more particularly about 15%, e.g., about 10%, such that the concentration of fuel supplied to the fuel cell increases.

In accordance with certain examples, the scheme described above and referred to in FIGS. 6-8D may be used in a direct methanol fuel cell (DMFC). For example, methanol may be introduced into the DMFC at the anode side using a modulation frequency. If load current remains constant, as the methanol is consumed at the anode additional methanol should be supplied to maintain a suitable voltage. If such additional methanol is not supplied at a suitable concentration to the anode, then a frequency analysis of the voltage will show the modulation frequency used to supply fuel to the fuel cell. In response to detection of the modulation frequency in the voltage, a higher concentration of methanol can be supplied to the anode for conversion to carbon dioxide and water. In particular, a signal may be sent to a controller to increase the rate at which methanol is supplied to a mixing tank to increase the methanol concentration in a fuel flow to the fuel cell. The person of ordinary skill in the art, given the benefit of this disclosure, will be able to use the sensors and methods disclosed herein with direct methanol fuel cells.

Figure 9:
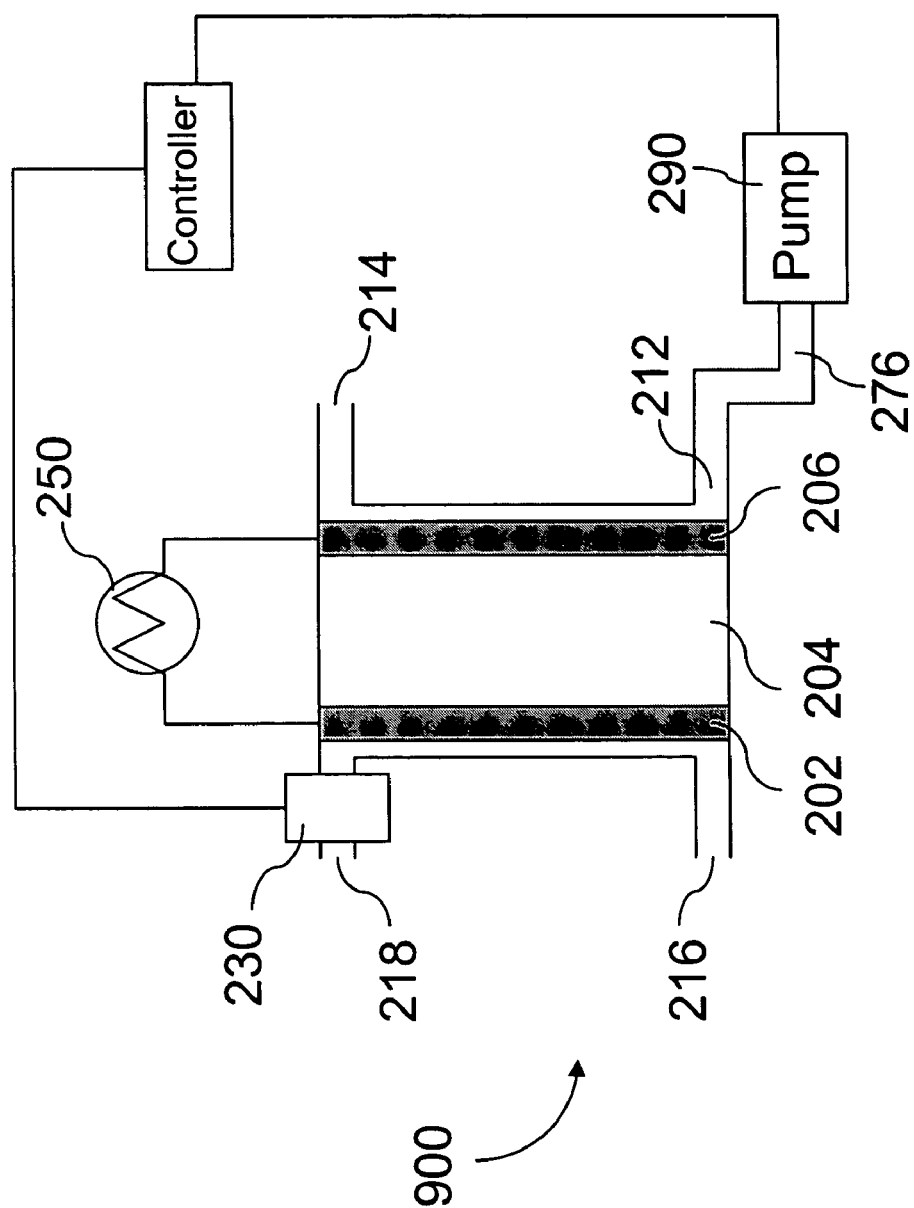
FIG. 9 is a schematic of a fuel cell assembly comprising a fuel cell electrically coupled to a controller and a fuel pump and further comprising a carbon dioxide sensor in an exhaust line, in accordance with certain examples.

In accordance with certain examples and referring to FIG. 2C, a sensor 230 may be placed in an air exhaust port 218 to detect carbon dioxide levels at the cathode side of the fuel cell. Fuel cells which use carbon based fuels typically produce carbon dioxide at the anode side of the fuel cell and water at the cathode side of the fuel cell. In instances where the carbon based fuel is supplied to the anode in high concentrations, the fuel can cross-over or be driven through the membrane to the cathode side of the fuel cell. The crossed-over fuel can react with the water at the cathode side to produce carbon dioxide on the cathode side. The produced carbon dioxide at the cathode side can be detected with a sensor. An illustration of this scheme for a direct methanol fuel cell is shown in FIG. 9. A direct methanol fuel cell 900 includes a cathode 202, an anode 206 electrically coupled to the cathode 202, and an electrolyte membrane 204 between the anode 206 and the cathode 202. A mixture of methanol/water fuel is supplied to the fuel cell 900 by pump 290 through fluid conduit 276 and into fuel intake port 212. When the concentration of methanol is within an acceptable range, the methanol is converted by the anode 206 to produce six proton molecules, six electrons and one carbon dioxide molecule. The half-reaction occurring at the cathode side of the fuel cell converts 3/2 molecules of oxygen, six protons and six electrons into 2 water molecules. The overall stoichiometric reaction is that one mole of methanol reactant and 3/2 moles of oxygen are converted to one mole of carbon dioxide and 3 moles of water.

In instances where the methanol concentration is too high, additional carbon dioxide is produced at the cathode as methanol reacts with water to produce six protons, six electrons and one carbon dioxide molecule. This unwanted cathode reaction reduces the overall efficiency of the fuel cell, as production of electrons at the cathode side of the fuel cell depolarizes the fuel cell and generally does not provide a useable current. To prevent cross-over of fuel to the cathode side of the fuel cell, a carbon dioxide sensor may be placed in an exhaust port of the fuel cell to monitor production of carbon dioxide. If the concentration of methanol supplied to the anode side of the fuel cell is too high, then carbon dioxide may be detected by the sensor, e.g., a carbon dioxide level above an ambient carbon dioxide level may be detected at the cathode, as crossed-over methanol reacts to produce the carbon dioxide. In instances where the methanol supplied to the fuel cell is at a suitable concentration or flow, no carbon dioxide (above an ambient level of carbon dioxide) should be detected by the sensor. In certain examples, the fuel concentration may be increased up to the point where carbon dioxide is detected by the sensor to ensure that the maximum amount of methanol is supplied to the anode. When carbon dioxide is detected by the sensor, the concentration of methanol may be reduced, for example, by 10% to about 90% such that enough methanol is supplied to the anode but not so much methanol is supplied to permit any substantial cross-over. It will be within the ability of the person of ordinary skill in the art, given the benefit of this disclosure, to regulate the fuel concentration to a fuel cell to reduce cross-over.

In accordance with certain examples, suitable sensors for detecting carbon dioxide include an infrared sensor, such as a Vernier carbon dioxide gas sensor, a solid electrolyte type carbon dioxide gas sensor and the like. The carbon dioxide may be detected by converting the carbon dioxide to oxalic acid ($H_2C_2O_4$) followed by subsequent detection of the oxalic acid. In some examples, the carbon dioxide may be converted to carbon monoxide using a reverse water-gas shift (RWGS) reaction, and the produced carbon monoxide may be detected using a CO sensor. In examples where CO is produced for detection, it may be desirable to remove CO from the fuel cell or fuel cell stack to prevent poisoning of the electrodes. Other methods of detecting carbon dioxide produced by a fuel cell will be readily selected by the person of ordinary skill in the art, given the benefit of this disclosure.

In accordance with certain examples, the methods disclosed herein may be implemented in any combination with one or more other methods disclosed herein. For example, in certain instances it may be advantageous to combine a sensor configured to detect a modulation frequency in a voltage output with a carbon dioxide sensor configured to detect carbon dioxide in exhaust air. Such a combination would permit detection of too little fuel with the sensor configured to detect a modulation frequency and detection of too much fuel with a sensor configured to detect carbon dioxide. The person of ordinary skill in the art, given the benefit of this disclosure, will be able to combine any of the sensors, methods, fuel cells, etc. disclosed herein with any one or more of the other sensors, methods, fuel cells, etc. disclosed herein.

Figure 10A:
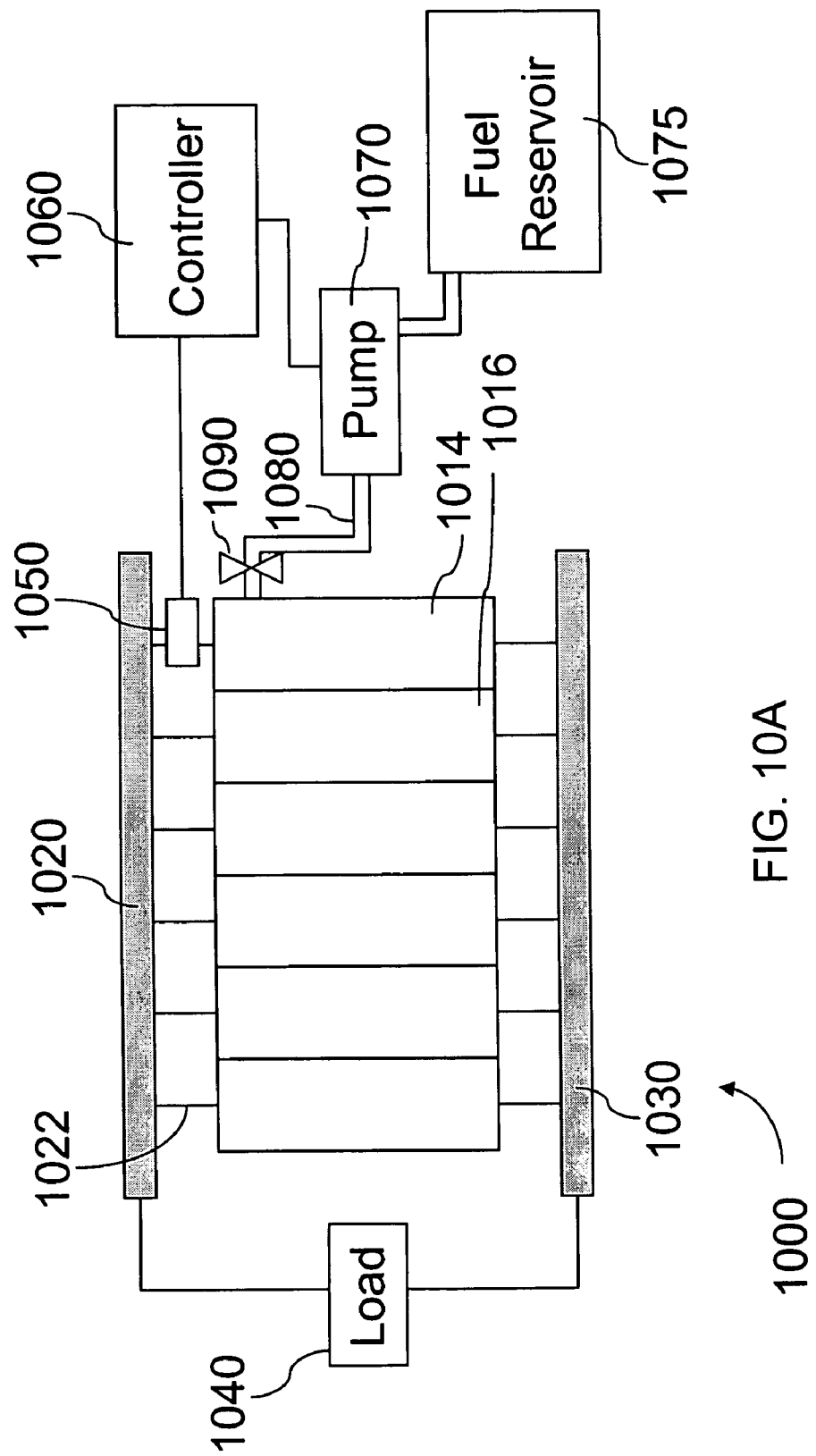
FIG. 10A is an example of fuel cell stack in which at least one of the fuel cells of the fuel cell stack comprises a sensor.

In accordance with certain examples, the sensors, methods and devices disclosed herein may be used in an individual fuel cell or may be used in one or more fuel cells of a fuel cell stack. For example and referring to FIG. 10A, an embodiment of a fuel cell stack where at least one of the fuel cells of the fuel cell stack comprises a sensor is shown. Fuel cell assembly 1000 comprises a fuel cell stack 1010 comprising a plurality of fuel cells, such as fuel cells 1014 and 1016. Each of the fuel cells may be electrically coupled to current collectors 1020 and 1030. The fuel cells may be coupled in series or may be coupled in parallel, or certain fuel cells of a fuel cell stack may be coupled in series while other fuel cells in a fuel cell stack may be coupled in parallel. In some examples, each fuel cell of a fuel cell stack is connected in series, and two or more fuel cell stacks may be connected in series or in parallel. In the example shown in FIG. 10A, the current collector 1020 is in the form of a plate that is electrically coupled to the anode side of each fuel cell, whereas the current collector 1030 is electrically coupled to the cathode side of each fuel cell. While the fuel cells are shown in FIG. 10A as being electrically coupled to the collector plates through lead or connects, such as lead 1022, in certain configurations the collector plates may be disposed onto or placed directly against the anode and/or cathode without any intervening lead. Suitable collector plates are made, for example, of a lightweight, strong, gas-impermeable, electron-conducting material, such as graphite, metals or composite materials. The current collector plates 1020 and 1030 are electrically coupled to each other through a lead 1035 to permit electrons to flow from current collector plate 1020, through load 1040, and to current collector plate 1030. In this illustrative example, a sensor 1050 may be placed at the anode side of the fuel cell 1014 and may be configured to implement the methods disclosed herein to regulate the fuel concentration to the anode of the fuel cell 1014. For example, the sensor 1050 may be electrically coupled to a controller 1060 such that a control signal from the sensor 1050 may be sent to the controller 1060, which may be configured to send a signal to increase the fuel concentration to a fuel cell 1014. For example, the controller 1060 can send a signal to increase the rate at which a pump 1070 is supplying fuel from a fuel reservoir 1075 to the fuel cell 1014. Alternatively, the controller may send a signal to increase the amount of fuel supplied to a mixing tank upstream of a fuel intake port such that a higher fuel concentration is fed to the fuel intake port. Such an increase in fuel concentration may be supplied only to fuel cell 1014 or may be supplied to each fuel cell of the fuel cell stack. For example, a fuel supply line, such as fuel supply line 1080, may be configured to supply fuel to each fuel cell of the fuel cell stack, or may be configured to supply fuel to one or a few fuel cells in the fuel cell stack. Alternatively, a single fuel supply line with branches may be used to provide fuel to the anode side of each fuel cell in a fuel cell stack, and one or more valves, such as valve 1090 may regulate the fuel supplied to each of the fuel cells such that different fuel cells can be supplied with different fuel flows even though the pump 1070 is supplying fuel at constant rate. Additional configurations and methods for controlling the amount of fuel supplied to one or more fuel cells in a fuel cell stack will be readily selected by the person of ordinary skill in the art, given the benefit of this disclosure.

In accordance with certain examples, the exact number of fuel cells in a fuel cell stack can vary depending on the desired voltage output. In certain applications, there are between about 2 and about 200 fuel cells in a fuel cell stack, more particularly about 5 to about 100 fuel cells in a fuel cell stack, e.g., about 5 to about 60 fuel cells in a fuel cell stack. However, in certain configurations, a fuel cell stack may include over 200 fuel cells.

In some examples, at least two of the fuel cells may be in series. In other examples, at least two of the fuel cells may be in parallel. In yet other examples, at least two of the fuel cells of a fuel cell stack may be in series, and at least two fuel cells of the same fuel cell stack may be in parallel. In certain examples, the fuel cells in a fuel cell stack are connected in series, and two or more different fuel cell stacks may be connected in series or in parallel. It will be within the ability of the person of ordinary skill in the art, given the benefit of this disclosure, to select or design suitable fuel cell stacks for use with the sensors and methods disclosed herein.

Figure 10B:
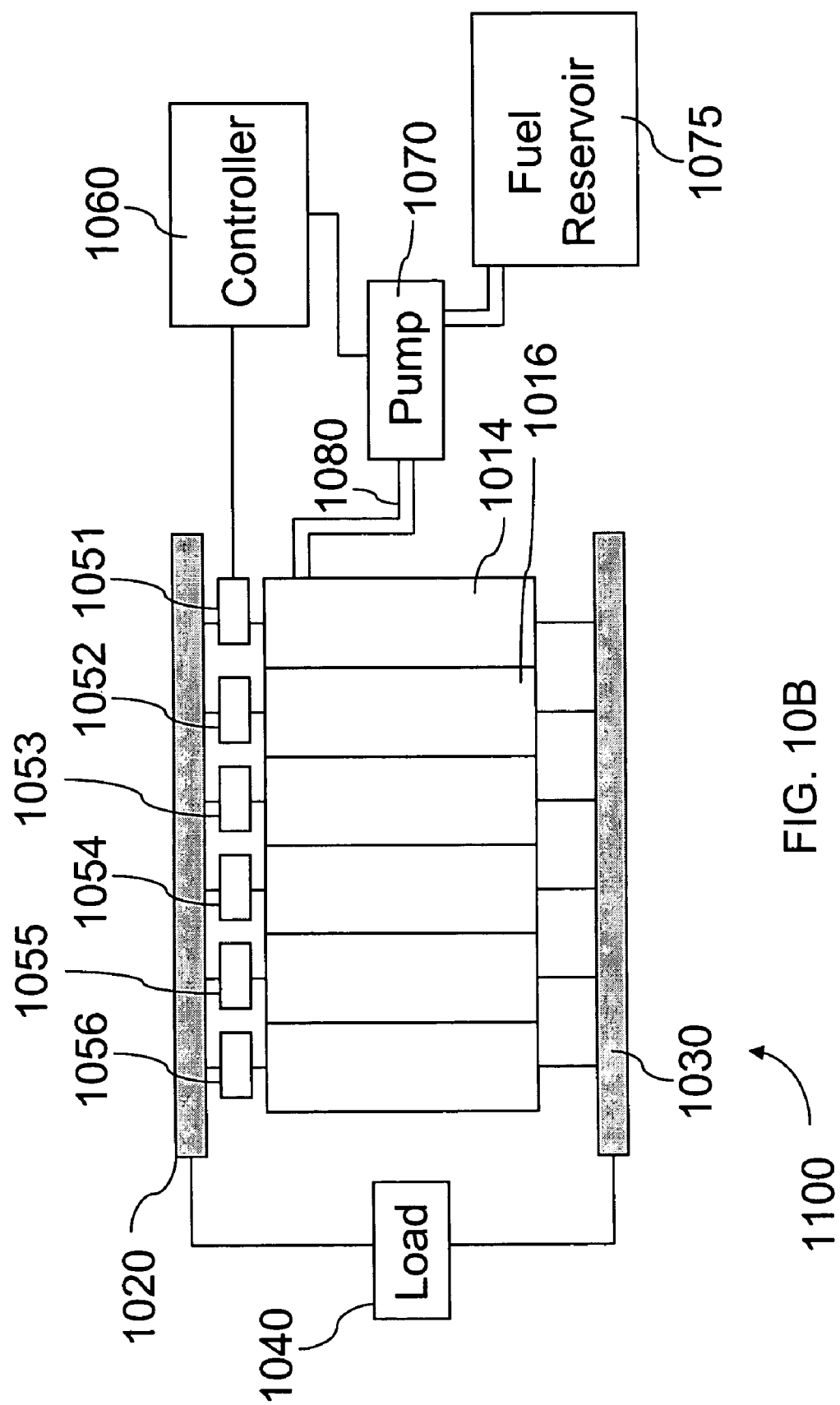
FIG. 10B is an example of a fuel cell stack where each of the fuel cells of the fuel cell stack comprises a sensor, in accordance with certain examples.

In accordance with certain examples, a fuel cell assembly may be configured wherein each of the fuel cells of the fuel cell stack is electrically coupled to a controller, as shown in FIG. 10B. For example, each fuel cell of a fuel cell assembly 1100 may include a sensor, such as sensors 1051, 1052, 1053, 1054, 1055 and 1056 that can send a control signal independently of one another to a controller 1060. In some examples, each fuel cell in a fuel cell stack may include suitable valving and the like which can be cycled, opened or closed by the controller 1060 to regulate the amount of fuel supplied to any particular fuel cell in the fuel cell assembly 1100. The sensors may implement any one or more of the methods disclosed herein, and in certain examples, one sensor, such as sensor 1051, may be configured to detect a voltage drop below a nominal voltage, whereas another sensor, such as sensor 1052, may be configured for detection of a modulation frequency used to supply fuel. Additional configurations of fuel cell assemblies comprising a plurality of sensors configured to implement the methods disclosed herein will be readily selected by the person of ordinary skill in the art, given the benefit of this disclosure.

Figure 11:
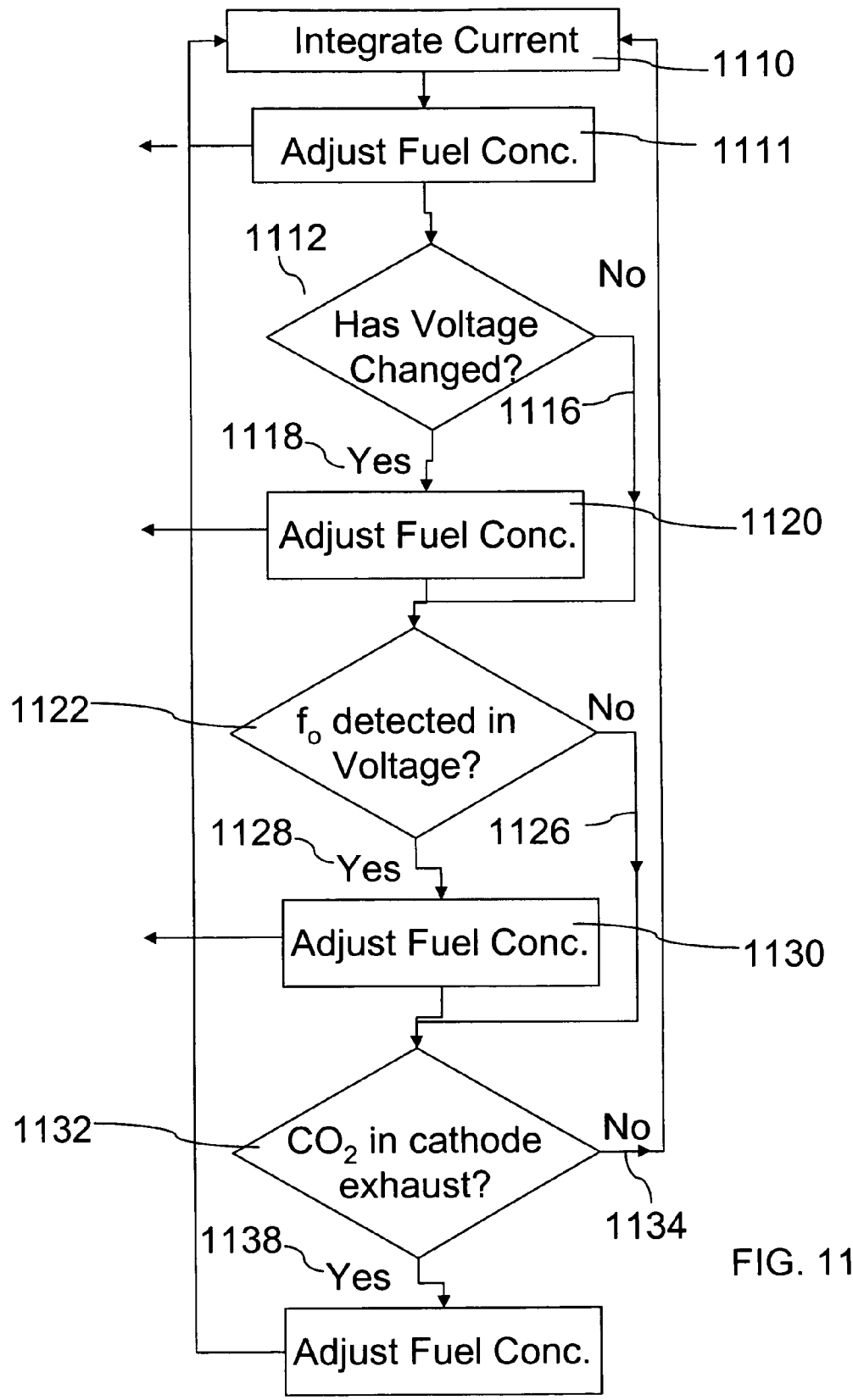
FIG. 11 is an illustrative flow chart, in accordance with certain examples.

In accordance with certain examples, the devices and methods disclosed herein may be implemented in a control scheme. For example and referring to the flow chart shown in FIG. 11, a first device may be configured to integrate current 1110. Should current be lower than desired, the fuel concentration 1111 can be increased such that current levels are suitable. As discussed herein, the first device may be configured as an inner control loop. An outer control loop may be implemented with the inner control loop. The outer control loop may include one or more of methods or operations 1112, 1122 or 1132 in FIG. 11. For example, a voltage change may be detected at 1112. If a voltage change is detected (step 1118), then fuel concentration may be adjusted, e.g., increased, at step 1120. If no voltage change is detected, the system may next detect if a fuel flow modulation frequency $f_0$ is present in the voltage 1122 through step 1116 (or could return to the current integration 1110). If a frequency is detected, then fuel concentration may be adjusted, e.g., increased, at step 1128. If no frequency is detected in the voltage, then the system may go to detection of carbon dioxide in the cathode exhaust 1132 through step 1126 (or could return to current integration 1110). If carbon dioxide is detected in the cathode exhaust, then fuel concentration can be adjusted, e.g., decreased, at step 1138. If no carbon dioxide is detected in the cathode exhaust, then the system may return to integration of current through step 1134. While the flow chart in FIG. 11 shows that three methods in an outer control loop may be implemented to regulate fuel concentration in a fuel cell, only one of the methods may be used, or combinations of two or more of the methods may be used. It will be within the ability of the person of ordinary skill in the art, given the benefit of this disclosure, to select suitable methods for regulating fuel concentration in a fuel cell.

In accordance with certain examples, a method of regulating fuel to a fuel cell may include detecting a decrease in a fuel cell voltage below a nominal fuel cell voltage and increasing fuel concentration at an anode of the fuel cell until the fuel cell voltage is above the nominal fuel cell voltage. In some examples, the method may further include decreasing fuel concentration at the anode of the fuel cell after the fuel cell voltage is above the nominal fuel cell voltage. In additional examples, the method may include comprising cycling the increasing fuel concentration and decreasing fuel concentration steps at a suitable rate to provide an acceptable voltage, e.g., a substantially constant voltage.

In accordance with certain examples, a method of regulating fuel to a fuel cell may include modulating fuel flow to an anode of a fuel cell at a first frequency and increasing fuel concentration at the anode of the fuel cell when the first frequency is detected in a fuel cell voltage. In certain examples, the method may further include decreasing fuel concentration at the anode of the fuel cell when the first frequency is not detected in the fuel cell voltage. In some examples, the method may further include cycling the increasing fuel concentration and decreasing fuel concentration steps at a suitable rate to provide an acceptable voltage, e.g., a substantially constant voltage.

In accordance with certain examples, a method of regulating fuel to a fuel cell may include detecting carbon dioxide at a cathode of the fuel cell, and decreasing fuel concentration at an anode of the fuel cell in response to detection of carbon dioxide at the cathode of the fuel cell. In some examples, the method may further include increasing fuel concentration at the anode of the fuel cell if fuel cell voltage decreases below a nominal fuel cell voltage. In other examples, the method may further include increasing fuel concentration to the anode of the fuel cell until carbon dioxide is detected at the cathode of the fuel cell. In additional examples, the method may also include cycling the decreasing fuel concentration and increasing fuel concentration steps at a frequency to minimize the level of carbon dioxide detected at the cathode. In yet other examples, the method may further include detecting a modulation frequency in a fuel cell voltage.

In accordance with certain examples, a sensor for use in a fuel cell is provided. In some examples, the sensor may be configured to detect a performance variable. Illustrative performance variables include, but are not limited to, voltage, current, carbon dioxide levels at the cathode or other variables that can be measured during operation of a fuel cell, such as water production, gases or species in exhaust streams and the like. In some examples, the sensor may be configured to detect if the voltage decreases below a set point or nominal voltage. In other examples, the sensor may be configured to detect the appearance of a fuel flow modulation frequency in a voltage. In yet other examples, the sensor may be configured to detect the presence of carbon dioxide in an exhaust stream at a cathode side of a fuel cell. Additional performance variables suitable for assessing the performance of a fuel cell will be readily selected by the person of ordinary skill in the art, given the benefit of this disclosure.

Although illustrative methods, sensors, fuel cells and fuel cell assemblies have been described above in terms of certain examples, various alterations, modifications, substitutions, additions and improvements will be readily apparent to the person of ordinary skill in the art, given the benefit of this disclosure. Such alterations, modifications, substitutions, additions and improvements are intended to be within the scope and spirit of the methods, sensors, fuel cells and fuel cell assemblies disclosed herein. It is also intended that the indefinite articles "a" and "an," as used above and in the appended claims, refer to one or more of the articles which they modify. It is further intended that the terms "include," "including" and "having," as used in the specification and the claims appended hereto, are interchangeable with the open ended term "comprising."

What is claimed is:

1. A control system configured to control fuel concentration at an anode of a fuel cell and to adjust the fuel concentration provided to the anode of the fuel cell in response to detection of a performance degradation, wherein the control system is configured to increase the fuel concentration provided to the anode in response to detection of a frequency in a fuel cell voltage that corresponds to a modulation frequency used to modulate fuel flow.

2. The control system of claim 1 further comprising a first device constructed and arranged to control the fuel concentration provided to the anode and a second device constructed and arranged to alter the fuel concentration provided to the anode.

3. The control system of claim 2 in which the second device is configured to increase the fuel concentration provided to the anode in response to detection of a voltage drop below a nominal voltage.

4. A control system configured to control fuel concentration at an anode of a fuel cell and to adjust the fuel concentration provided to the anode of the fuel cell in response to detection of a performance degradation, the control system further comprising a first device constructed and arranged to control the fuel concentration provided to the anode and a second device constructed and arranged to alter the fuel concentration provided to the anode, wherein the second device is configured to increase the fuel concentration provided to the anode in response to detection of a frequency in a fuel cell voltage that corresponds to a modulation frequency used to modulate fuel flow.

5. The control system of claim 2 in which the second device is configured to decrease the fuel concentration provided to the anode in response to detection of carbon dioxide at a cathode of the fuel cell.

6. The control system of claim 1 further comprising a sensor configured to detect the performance degradation.

7. The control system of claim 1 in which the first device is configured to integrate current.

8. A fuel cell comprising:
a cathode;
an anode electrically coupled to the cathode;
an electrolyte between the cathode and the anode; and
a control system configured to control fuel concentration provided to the anode and to adjust the fuel concentration provided to the anode in response to detection of a performance degradation, and wherein the control system is configured to adjust the fuel concentration provided to the anode in response to detection of a presence of a frequency in a fuel cell voltage that corresponds to a modulation frequency used to modulate flow of fuel.

9. The fuel cell of claim 8 further comprising a first device constructed and arranged to control the fuel concentration provided to the anode and a second device constructed and arranged to alter the fuel concentration provided to the anode.

10. The fuel cell of claim 9 in which the second device is configured to increase the fuel concentration provided to the anode in response to detection of a voltage drop below a nominal voltage.

11. A fuel cell comprising:
a cathode:
an anode electrically coupled to the cathode;
an electrolyte between the cathode and the anode;
a control system configured to control fuel concentration provided to the anode and to adjust the fuel concentration provided to the anode in response to detection of a performance degradation;
a first device constructed and arranged to control the fuel concentration provided to the anode; and
a second device constructed and arranged to alter the fuel concentration provided to the anode in which the second device is configured to increase the fuel concentration provided to the anode in response to detection of a frequency in a fuel cell voltage that corresponds to a modulation frequency used to modulate flow of fuel.

12. The fuel cell of claim 9 in which the second device is configured to decrease the fuel concentration provided to the anode in response to detection of carbon dioxide at a cathode of the fuel cell.

13. The fuel cell of claim 8 further comprising a sensor configured to detect the performance degradation.

14. A method of regulating fuel concentration in a fuel cell, the method comprising:
modulating a fuel flow at a modulation frequency;
detecting a performance degradation of the fuel cell;
altering fuel concentration provided to an anode of the fuel cell in response to detection of the performance degradation; and
increasing the fuel flow provided to the anode when the modulation frequency is detected in a fuel cell voltage.

15. The method of claim 14 further comprising increasing the fuel concentration provided to the anode in response to detection of a voltage drop below a nominal voltage.

16. A method of regulating fuel concentration in a fuel cell, the method comprising:
detecting a performance degradation of the fuel cell;
altering fuel concentration provided to an anode of the fuel cell in response to detection of the performance degradation;
modulating the flow of the fuel to the anode at a first frequency; and
increasing the fuel concentration provided to the anode when the first frequency is detected in a fuel cell voltage.

17. The method of claim 14 further comprising decreasing the fuel concentration provided to the anode in response to detection of carbon dioxide at a cathode of the fuel cell.

18. The method of claim 14 further comprising configuring a first device to control the fuel concentration in the fuel cell and configuring a second device to alter the fuel concentration provided to the fuel cell in response to detection of the performance degradation.

19. The method of claim 18 further comprising increasing the fuel concentration provided to the anode in response to detection of a voltage drop below a nominal voltage, or increasing the fuel concentration provided to the anode in response to detection of a frequency in a fuel cell voltage that corresponds to a modulation frequency used to modulate fuel flow.

20. The method of claim 19 further comprising decreasing the fuel concentration provided to the anode in response to detection of carbon dioxide at a cathode of the fuel cell.

21. The method of claim 14 further comprising configuring a sensor to detect the performance degradation.

\* \* \* \* \*